United States Patent
Al-Dulaimi et al.

(10) Patent No.: US 11,483,218 B2
(45) Date of Patent: Oct. 25, 2022

(54) AUTOMATING 5G SLICES USING REAL-TIME ANALYTICS

(71) Applicant: EXFO Solutions SAS, Saint-Jacques-de-la-Lande (FR)

(72) Inventors: Anwer Al-Dulaimi, Montreal (CA); Juan Roberto Artola Caballero, Madrid (ES); Farah Slim, Rennes (FR)

(73) Assignee: EXFO Solutions SAS, Saint Jacques-de (FR)

( * ) Notice: Subject to any disclaimer, the term of this patent is extended or adjusted under 35 U.S.C. 154(b) by 0 days.

(21) Appl. No.: 17/209,370

(22) Filed: Mar. 23, 2021

(65) Prior Publication Data

US 2021/0306235 A1   Sep. 30, 2021

Related U.S. Application Data

(60) Provisional application No. 63/000,833, filed on Mar. 27, 2020.

(51) Int. Cl.
*H04L 41/5054* (2022.01)
*H04L 41/12* (2022.01)
(Continued)

(52) U.S. Cl.
CPC ......... *H04L 41/5054* (2013.01); *H04L 41/12* (2013.01); *H04L 41/5003* (2013.01);
(Continued)

(58) Field of Classification Search
CPC . H04L 41/5054; H04L 41/12; H04L 41/5003; H04L 41/5032; H04L 43/0817; H04W 24/04; H04W 24/08
See application file for complete search history.

(56) References Cited

U.S. PATENT DOCUMENTS 9,424,121 B2   8/2016   Kushnir et al.
9,838,272 B2  12/2017   Djukic et al.
(Continued)

FOREIGN PATENT DOCUMENTS

WO   2013044974 A1   4/2013
WO   2015/065368 A1  5/2015
(Continued)

OTHER PUBLICATIONS

Athanasios Karapantelakis, DevOps for IoT Applications using Cellular Networks and Cloud, 2016, IEEE, pp. 340-347 (Year: 2016).*

(Continued)

*Primary Examiner* — Philip C Lee
(74) *Attorney, Agent, or Firm* — Clements Bernard Baratta; Lawrence A. Baratta, Jr.

(57) ABSTRACT

Systems and methods implemented by a workflow engine include obtaining data from a plurality of interfaces and network functions, NF, in one or more datacenters associated with a 5G core, 5GC, network, wherein the data relates to lifecycle management in the 5GC network; responsive to analyzing the data with a set of key performance indicators, KPI, and rules associated therewith that are formulated to detect anomalies that impact the lifecycle management, generating an alarm based on the analyzing based on detection of an anomaly that impacts the lifecycle management; and creating a workflow based on the alarm and pushing the workflow to the 5GC network via an orchestrator.

20 Claims, 11 Drawing Sheets

(51) Int. Cl.
*H04L 41/5003* (2022.01)
*H04L 41/50* (2022.01)
*H04L 43/0817* (2022.01)
*H04W 24/04* (2009.01)
*H04W 24/08* (2009.01)

(52) U.S. Cl.
CPC ...... *H04L 41/5032* (2013.01); *H04L 43/0817* (2013.01); *H04W 24/04* (2013.01); *H04W 24/08* (2013.01)

(56) References Cited

U.S. PATENT DOCUMENTS

| | | | |
|---|---|---|---|
| 9,918,239 | B2 | 3/2018 | Thomas et al. |
| 10,142,889 | B2 | 11/2018 | Dao |
| 10,313,997 | B2 | 6/2019 | Singh et al. |
| 10,348,517 | B2 | 7/2019 | McNamee et al. |
| 10,448,320 | B2 | 10/2019 | Vrzic et al. |
| 10,505,870 | B2 * | 12/2019 | Cui .................. H04L 49/70 |
| 10,581,984 | B2 | 3/2020 | Livanos et al. |
| 10,721,144 | B2 * | 7/2020 | Malboubi ............ H04L 43/12 |
| 10,785,634 | B1 | 9/2020 | Fiorese et al. |
| 10,841,974 | B1 | 11/2020 | Young et al. |
| 10,892,958 | B2 | 1/2021 | Bor-Yaliniz et al. |
| 10,911,326 | B2 | 2/2021 | Han et al. |
| 11,012,294 | B2 * | 5/2021 | Ratnasamy ......... H04L 43/0876 |
| 2013/0258865 | A1 | 10/2013 | Kovvali et al. |
| 2016/0212017 | A1 | 7/2016 | Li et al. |
| 2016/0359682 | A1 | 12/2016 | Senarath et al. |
| 2017/0317894 | A1 | 11/2017 | Dao et al. |
| 2018/0262924 | A1 | 9/2018 | Dao et al. |
| 2018/0367373 | A1 * | 12/2018 | Chou .................. H04L 41/5009 |
| 2019/0037409 | A1 | 1/2019 | Wang et al. |
| 2019/0109768 | A1 | 4/2019 | Senarath et al. |
| 2019/0215730 | A1 | 7/2019 | Qiao et al. |
| 2019/0222489 | A1 | 7/2019 | Shan et al. |
| 2019/0253917 | A1 | 8/2019 | Dao et al. |
| 2019/0268777 | A1 | 8/2019 | Simon et al. |
| 2019/0380037 | A1 | 12/2019 | Lifshitz et al. |
| 2019/0394655 | A1 | 12/2019 | Rahman et al. |
| 2020/0022016 | A1 | 1/2020 | Fenoglio et al. |
| 2020/0042365 | A1 | 2/2020 | Tanna et al. |
| 2020/0044943 | A1 | 2/2020 | Bor-Yaliniz et al. |
| 2020/0106812 | A1 | 4/2020 | Verma et al. |
| 2020/0112868 | A1 | 4/2020 | Shariat et al. |
| 2020/0112920 | A1 | 4/2020 | Dao et al. |
| 2020/0112921 | A1 | 4/2020 | Han et al. |
| 2020/0296603 | A1 | 9/2020 | Suthar et al. |
| 2021/0021494 | A1 | 1/2021 | Yao et al. |
| 2021/0058323 | A1 * | 2/2021 | Thanneeru ............ H04L 41/022 |
| 2021/0105665 | A1 | 4/2021 | Bennett et al. |

FOREIGN PATENT DOCUMENTS

| | | | | |
|---|---|---|---|---|
| WO | WO-2015065368 | A1 * | 5/2015 | .............. G06F 16/22 |
| WO | 2018215046 | A1 | 11/2018 | |
| WO | WO-2018215046 | A1 * | 11/2018 | .............. H04W 4/50 |
| WO | 2019231435 | A1 | 5/2019 | |
| WO | 2019196796 | A1 | 10/2019 | |
| WO | 2019197467 | A1 | 10/2019 | |
| WO | 2019231435 | A1 | 12/2019 | |
| WO | 2019246530 | A1 | 12/2019 | |
| WO | 2020001795 | A1 | 1/2020 | |
| WO | 2020018012 | A1 | 1/2020 | |
| WO | 2020031158 | A1 | 2/2020 | |
| WO | 2020032769 | A1 | 2/2020 | |
| WO | WO-2020061312 | A1 * | 3/2020 | .............. H04W 12/06 |
| WO | 2020074092 | A1 | 4/2020 | |
| WO | 2020173580 | A1 | 9/2020 | |

OTHER PUBLICATIONS

ETSI TS 129 520 V15.3.0, 5G; 5G System; Network Data Analytics Services; Stage 3 (3GPP TS 29.520 version 15.3.0 Release 15), Apr. 2019. pp. 1-39.

García et al., "Big data analytics for automated QoE management in mobile networks," IEEE Communications Magazine, Aug. 2019, pp. 1-7.

Kaloxylos et al., "Application of Data Mining in the 5G Network Architecture," ICDT 2018 : The Thirteenth International Conference on Digital Telecommunications, ISBN: 978-1-61208-623-1, pp. 39-44.

Feb. 25, 2021, Combined Search and Examination Report under Sections 17 and 18(3) for Application No. GB2013187.6, pp. 1-6.

Radcom, "Delivering a Superior Customer Experience for 5G," pp. 1-30.

Radcom, "Network Data Analytics Function," Radcom's NWDAF solution correlates multiple data sources to ensure a high customer experience for 5G, Mar. 31, 2020, pp. 1-7.

Radcom, "Radcom's Network Data Analytics Function (NWDAF) Data analytics and containerized service assurance for 5G," Jun. 2020, pp. 1-15.

Mayer, "RESTful APIs for the 5G Service Based Architecture," 2018, pp. 101-116.

Sandvine, "Sandvine to Showcase New Portfolio of Active Network Intelligence Use Cases at Mobile World Congress: Unveiling new version of eVolution virtual analytics probe targeted at 5G Network Data Analytics," Feb. 21, 2018, pp. 1-3.

Barmpounakis et al., "Data Analytics for 5G Networks: A Complete Framework for Network Access Selection and Traffic Steering," International Journal on Advances in Telecommunications, vol. 11 No. 3 & 4, year 2018, http://www.iariajournals.org/telecommunications/, pp. 101-114.

Toosi et al., "Management and Orchestration of Network Slices in 5G, Fog, Edge and Clouds," Chapter 4, pp. 1-31.

Hunt et al., "End-toEnd Network Service Lifecycle Demonstration," IEEE Conference on Network Function Virtualization and Software Defined Networks 2015 Demo Track, pp. 9-12.

Karapantelakis et al., "DevOps for IoT Applications using Cellular Networks and Cloud," 2016 IEEE 4th International Conference of Future Internet of Things and Cloud, pp. 340-347.

Aug. 4, 2021, European Search Reported issued for European Patent Application No. EP 21 16 4892.

Al-Dulaimi et al., IEEE Vehicular Technology Magazine, "Interfacing 5G Orchestrators With Data Analytics Functions," Jun. 2020, pp. 18-20.

Mouchili et al., RightsLink, "Call Data Record based Big Data Analytics for Smart Cities," 2019, pp. 1-7.

Pateromichelakis et al., IEEE Access, "End-to-End Data Analytics Framework for 5G Architecture," vol. 7, 2019, pp. 40295-40312.

Sajjad et al., "Inter-Slice Mobility Management in 5G: Motivations, Standard Principles, Challenges and Research Directions," Submitted to IEEE for Possible Publication, Mar. 2020, pp. 1-7.

Han et al., "Admission and Congestion Control for 5G Network Slicing," IEEE, 2018, pp. 1-6.

ZTE, "Some corrections to Nnwdaf_AnalyticsInfo Service," 3GPP Draft, C3-202053, 3GPP TSG WG3 Meeting #109e, Apr. 16-24, 2020, 9 pages.

Sep. 10, 2021, European Search Report for European Application No. EP 21 16 8043.

Afolabi et al., "Network Slicing and Softwarization: A Survey on Principles, Enabling Technologies, and Solutions," IEEE Communications Surveys & Tutorials, vol. 20, No. 3, Mar. 21, 2018, pp. 2429-2453.

Santos et al., "SelfNet Framework self-healing capabilities for 5G mobile networks," Open Access, DOI: 10.1002/ett.3049, Sep. 30, 2016.

Casellas et al., "Enabling Data Analytics and Machine Learning for 5G Services within Disaggregated Multi-Layer Transport Networks," IEEE, Jul. 1, 2018.

Corici et al., "Practical Performance Degradation Mitigation Solution using Anomaly Detection for Carrier-Grade Software Networks," 2018 IEEE Conference on Standards for Communications and Networking (CSCN), Dec. 20, 2018.

(56) References Cited

OTHER PUBLICATIONS

Pateromichelakis et al., "End-to-End Data Analytics Framework for 5G Architecture," IEEE Access, vol. 7, 2019, Mar. 5, 2019, pp. 40295-40312.

Jul. 12, 2022, European Search Report issued for European Patent Application No. EP 22 16 9188.

3GPP, "3rd Generation Partnership Project; Technical Specification Group Services and System Aspects; Study of Enablers for Network Automation for 5G," 3GPP TR 23.791 v1.1.0, Nov. 3, 2018, pp. 1-97.

Nokia et al., "Soution to Key Issue #6: NWDAF analytics usage for UPF selection," 3GPP TSG-SA WG2 Meeting #129, S2-1810737, Oct. 15-19, 2018, 2 pgs.

Tencent et al., "NRF Registration and Discovery Service Update," SA WG2 Meeting #133, S2-1905153, May 13-17, 2019, 5 pgs.

* cited by examiner

AUTOMATING 5G SLICES USING REAL-TIME ANALYTICS

CROSS-REFERENCE TO RELATED APPLICATION(S)

The present disclosure claims priority to U.S. Provisional Patent Application No. 63/000,833, filed Mar. 27, 2020, the contents of which are incorporated herein by reference in their entirety.

FIELD OF THE DISCLOSURE

The present disclosure generally relates to networking. More particularly, the present disclosure relates to systems and methods for automating 5G slices using real-time analytics.

BACKGROUND OF THE DISCLOSURE

Over the last few years, the research and standardization communities have worked collaboratively to develop a composable fifth-generation (5G) network for the digitized connected world of humans and machines. This has been depicted in every single segment of the new communication system, starting by the powerful reachable air interface supported by New Radio (NR), multi-access edge computing, new transport network featuring dense wavelength division multiplexing (DWDM), the service-based architecture (SBA) of 5G core network, end-to-end (E2E) network slicing, network function virtualization (NFV) and service automation, etc. Using predefined policies, this is a software-driven network that tactically restructures domains and mobilizes resources in response to traffic changes. However, the current network topology, resources, functionality, and task assignment requires a self-optimization mechanism for automating network topology interface and components in response to dynamic changes in traffic and operating expenses.

With respect to network monitoring, there is a need to define a mechanism for: instantiating new probes, modifying existing probes, change the topology of the solution to meet network demands, reduce the footprint, or during self-troubleshooting. Also, the solution captures network anomaly that could be delivered as commands to the orchestrator to trigger lifecycle management (LCM) events to restore network functionality and optimization.

With respect to network automation, dynamic creation of topology and orchestration specification for cloud applications (TOSCA) templates is a key technology pillar for automating 5G and beyond networks. There are several modeling languages that are used today in VFV orchestration, such as TOSCA, YANG, Openstack HEAY models and Business Protocol Model and Notation (BPMN). The model driven principle is a key enabler for lifecycle management operations that automates various cloud operations such as creation, update, termination, scalability, etc. Although those processes have been tested, current orchestrator platforms are only supporting predefined policies for lifecycle management operations. This requires human intervention to define new LCM policies for a cloud network function (CNF) and then upload the templates to the orchestrator. The LCM operations should be either triggered manually which is the NFV orchestration main scope according to the ETSI NFV reference, or through predefined policy templates that are bundled with orchestration templates to get full automation, and this comes in service orchestration scope which is going beyond NFV orchestration scope by including intelligence and service assurance features to the traditional orchestration platforms.

All other proposals for self-automated LCM are assuming Al-based orchestrators with some inputs from hypervisor telemetry services. This means that orchestrators have limited ability to scale/modify/instantiate any virtual machines/containers with any of 5G slices because there are no indicators about internal processed load or capacity status. This is a major drawback in current designs for 5G and beyond networks and will impose a significant amount of work to create policy/automation templates for each state transition. The NFV community is working to develop automated smart orchestrators (e.g., ONAP), but there is no use of network functions analytics to automate network topology and resources for 5G and beyond.

BRIEF SUMMARY OF THE DISCLOSURE

The present disclosure relates to systems and methods for automating 5G slices using real-time analytics. The present disclosure includes systems and methods implemented by a workflow engine include obtaining data from a plurality of interfaces and network functions, NF, in one or more datacenters associated with a 5G core, 5GC, network, wherein the data relates to lifecycle management in the 5GC network; responsive to analyzing the data with a set of key performance indicators, KPI, and rules associated therewith that are formulated to detect anomalies that impact the lifecycle management, generating an alarm based on detection of an anomaly that impacts the messaging of mobile network or network function status; and creating a workflow based on the alarm and pushing the workflow to restructure the topology of the 5GC network via an orchestrator.

The present disclosure enables lifecycle management operation with management and monitoring systems and 5GC NFs. The present disclosure leverages orchestration features using anomaly detection from monitoring systems to reduce the disturbance of services. Advantageously, this approach transforms a monitoring system into an active element of NFV orchestrators and enables the orchestration to be not only resource oriented but also service application aware intuitively. For 5G network operators, this enables real-time automation and dynamic creation of slices considering the real-time status and anomaly reports, reducing service interruptions resulted from the full-scale lifecycle management operations by including only the necessary operations as defined the workflow.

In various embodiments, the present disclosure includes a method including steps implemented by a workflow engine, a system with one or more processors configured to implement the steps, and a non-transitory computer-readable medium having instructions stored thereon for programming a workflow engine to perform the steps. The steps include obtaining data from a plurality of distributed probes and network functions, NF, in one or more datacenters associated with a 5G core, 5GC, network, wherein the data relates to lifecycle management in the 5GC network and includes telecom data from the distributed probes and computing data from the NF; responsive to analyzing and correlating the telecom data and the computing data to detect anomalies that impact the lifecycle management, generating an alarm based on the analyzing based on detection of an anomaly that impacts the lifecycle management; and creating a workflow based on the alarm and pushing the workflow to the 5GC network via an orchestrator.

The steps can include the orchestrator receiving the workflow as a topology and orchestration specification for cloud applications, TOSCA, template and triggering the workflow as a custom lifecycle management operation. The steps can include obtaining the data from the plurality of interfaces and the NF via a monitoring system that implements the workflow engine and is connected to the plurality of distributed probes and the NF. The monitoring system and the workflow engine can communicate through application programming interfaces, APIs, in a cloud environment. The plurality of probes can include cloud network functions, CNFs, that include any of user plane, UP, probes, control plane, CP, probes, radio access network, RAN, probes, and fiber probes. The NF can be components configured to obtain the computing data in the data centers from a network data analytics function, NWDAF. The workflow can be one of instantiating or removing a probe, recreating NFs, assigning resources to NFs, or migrating NFs, a modify operation and a custom operation, each for a cloud network function, CNF, in the 5GC network, a custom operation to instantiate a new virtual network function, VNF, in the 5GC network, via the orchestrator, and instantiating an active verifier to trigger messages in the 5GC network to determine functionality and performance. The obtaining, the generating, and the creating can be performed in real-time during operation of the 5GC network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
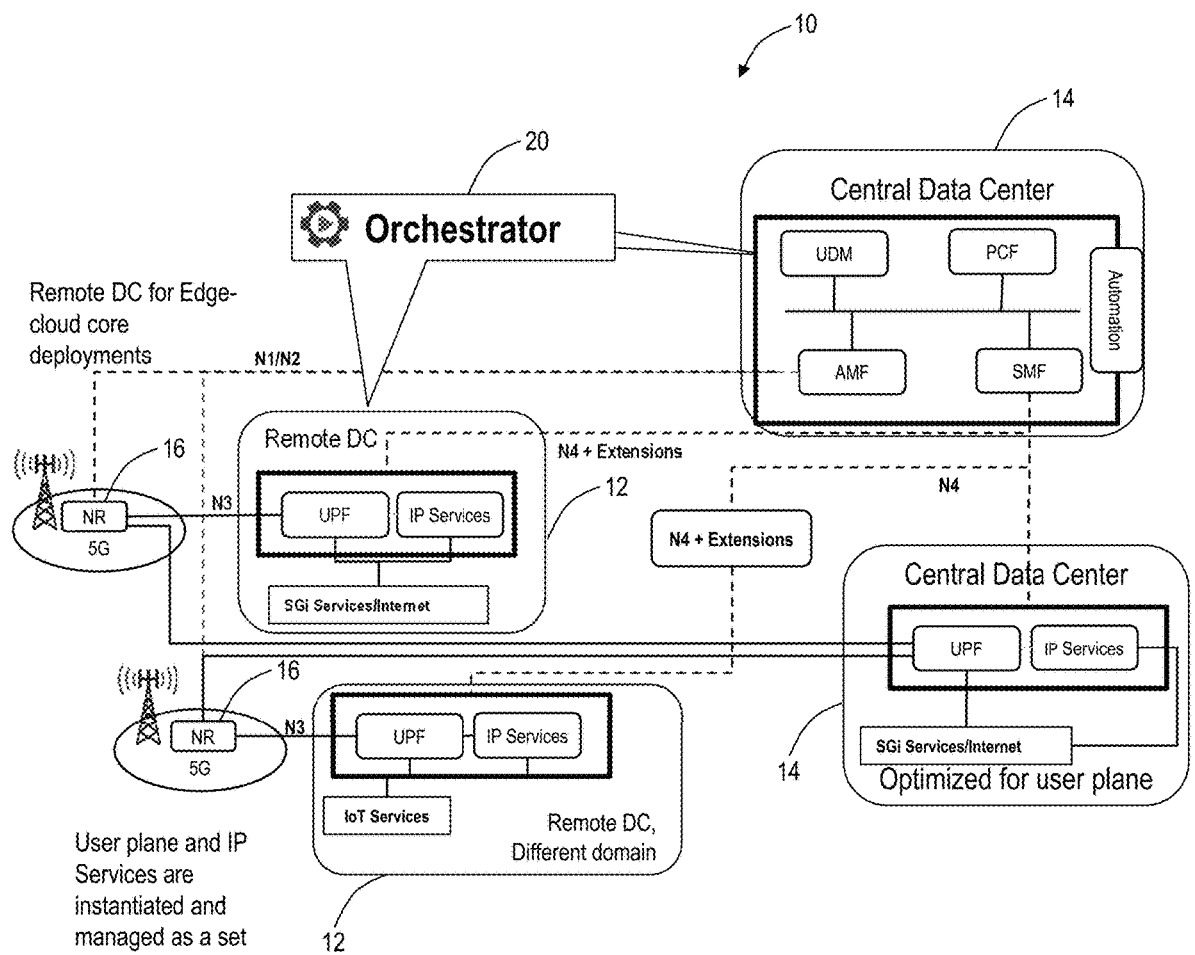
FIG. 1 is a block diagram of 5G core network functions in a distributed service deployment.

The present disclosure relates to systems and methods for automating 5G slices using real-time analytics. The present disclosure enables lifecycle management operation with management and monitoring systems and 5GC NFs. The present disclosure leverages orchestration features using anomaly detection from monitoring systems to reduce the disturbance of services. Advantageously, this approach transforms a monitoring system into an active element of the network orchestration cycle. For 5G network operators, this enables real-time automation and dynamic creation of slices considering the real-time status and anomaly reports, reducing the lifecycle management operations by including only the necessary operations as defined by the workflow.

With 5G, the transformation towards a self-optimized network must implement the necessary tools for sensing network status and analyze the necessary subsequent actions. Remarkably, the 5G have those technical enablers defined already through the management data analytics service (MDAS). This service provides data analytics of different network components through monitoring element status, load levels, resources, etc. The acquired parameters are representative performance data for objects, network functions (NFs), network slices, and segments. Those analytics are ingested into the policy control function of that slice or service type to determine compliance with predefined status rules. This analytical system allows for balancing the service and preventing any interruptions resulted from unexpected incoming load or lack of enough processing resources. The MDAS has all the necessary functions that can be deployed across the network sites for on-time determination of network status. However, this service is still limited to policy enforcement functionalities and limited predictive/behavorial/anomaly detection. The MDAS needs to be interfaced to NFV management and orchestration (MANO) framework. This would allow orchestrators to access the telemetry services of both logic and physical networks for an automotive network that can devise its own resource management policies.

The 5G performance promises motivated all the technical advances that have been made over the last few years. However, there is still a need to understand the exact capabilities of those new network components and their compliance within fully automated architectures. Therefore, operators will need to deploy testing tools that operate in a live network to verify the functionality and tolerance of network components. This process will need to be implemented for every single software and hardware component to define refinement aspects and resilience factors. Moreover, conducting various analytics will allow research and development teams to provide the necessary solutions that resolve any 5G defects and define the initiative for beyond 5G networks.

Accordingly, the present disclosure relates to systems and methods for automating 5G slices using real-time analytics.

Distributed Cloud

FIG. 1 is a block diagram of a cloud-based network 10 in a distributed service deployment. The 5G core (5GC) components will be segregated between a mobile edge cloud (MEC)/remote datacenter 12 and a central datacenter 14 where the main 5GC slice is located. A new radio (NR) 16 can communicate with components in the remote datacenter 12 via an N3 interface. The remote datacenter 12 can include user plane functions (UPF), IP services, etc. The NR 16 can communicate with the central datacenter 14 via N1/N2 interfaces. The central datacenter 14 can include unified data management (UDM), policy control functions (PCF), access and mobility management functions (AMF), session management functions (SMF), etc. The advantage of this architecture is it reduces the time delays through local access to user plane (UP) traffic. Also, there can be an orchestrator 20 connected to the remote datacenter 12 and the central datacenter 14. As is known in the art, the orchestrator 20 can be a processing device that is configured to implement various functions described herein.

NWDAF

Figure 2:
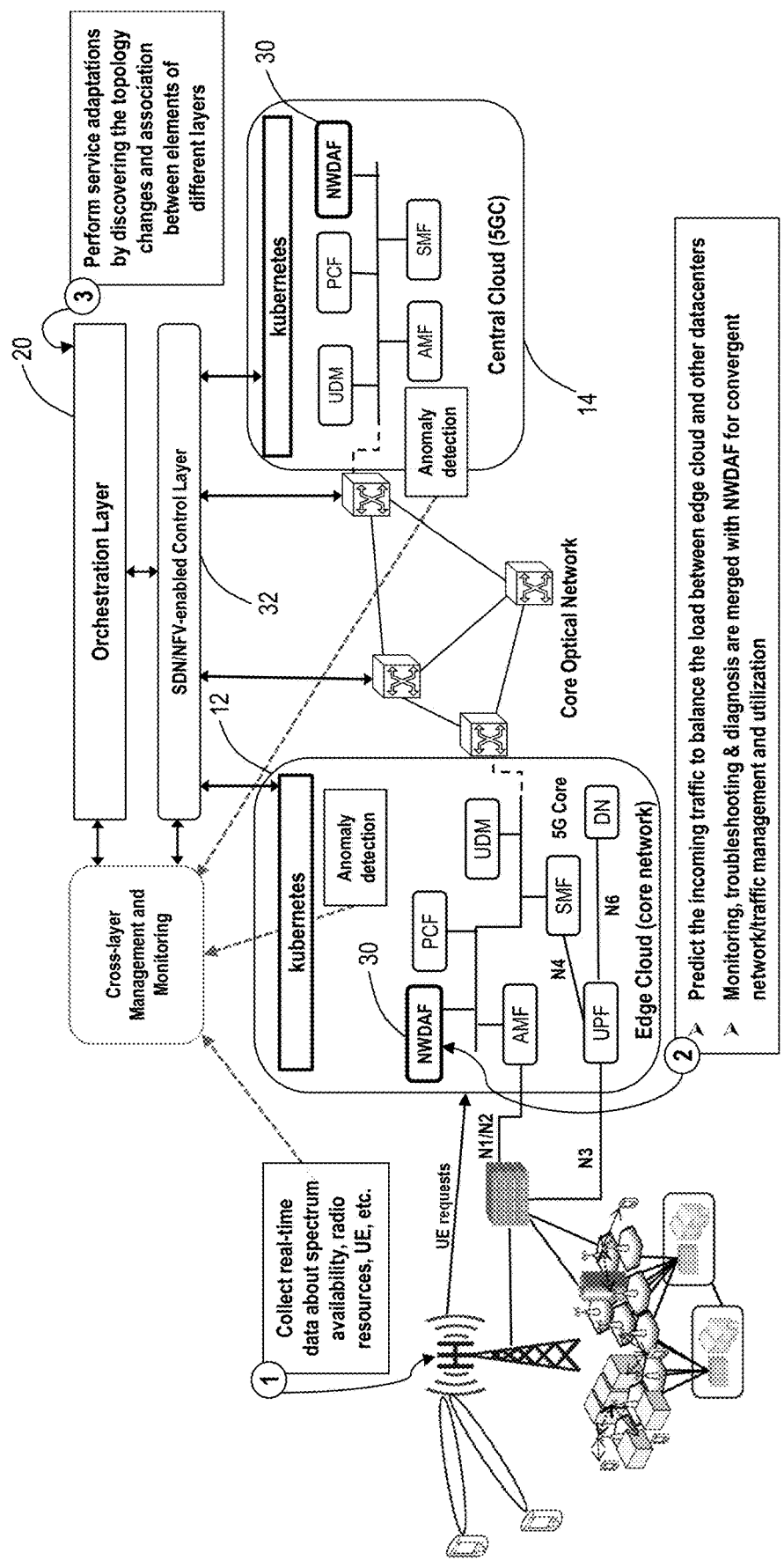
FIG. 2 is a block diagram of network data analytics function (NWDAF) functionality to collect network functions (NFs) status, metrics, etc.

FIG. 2 is a block diagram of network data analytics function (NWDAF) functionality 30 to collect NFs status, metrics, etc. The NWDAF functionality 30 is implemented in the remote datacenter 12 and the central datacenter 14. Monitoring will include radio resources and UE connectivity on the RAN side and anomaly detection on the core side for cross-layer management and monitoring between the orchestrator 20 and a software-defined networking (SDN)/NFV-enabled control layer 32. It is possible to prioritize the request processing subject to radio resource availability. Monitoring and troubleshooting, and diagnosis are merged with the NWDAF functionality 30 for convergent network/traffic management and utilization. Using all ingested data, the orchestrator would be able to perform LCM operations soon after discovering the topology changes and association between elements of different layers.

Monitoring this distributed topology will involve:

Instantiation of local virtual probes for each core (MEC and Central 5GC/per slice), and Different probes will ingest their data into a central Big Data processing system.

As described herein, virtual probes or simply probes can be software, such as NFVs that are configured to analyze real-world network traffic and obtain reliable insight into subscriber experience, analyze the performance and behavior of network components in a dynamic environment via KPIs and KQIs, generate call data records to troubleshoot any issue on the network and identify its root cause, and the like.

The probes 40 can be configured to obtain data on the N1 and/or N2 interfaces as well as based on service-based interfaces (e.g., hypertext transfer protocol (HTTP)). The obtained data can be published on a message bus 42 for storage 44 or use in a trusted shell (TSH) session.

Architectures

Figure 3:
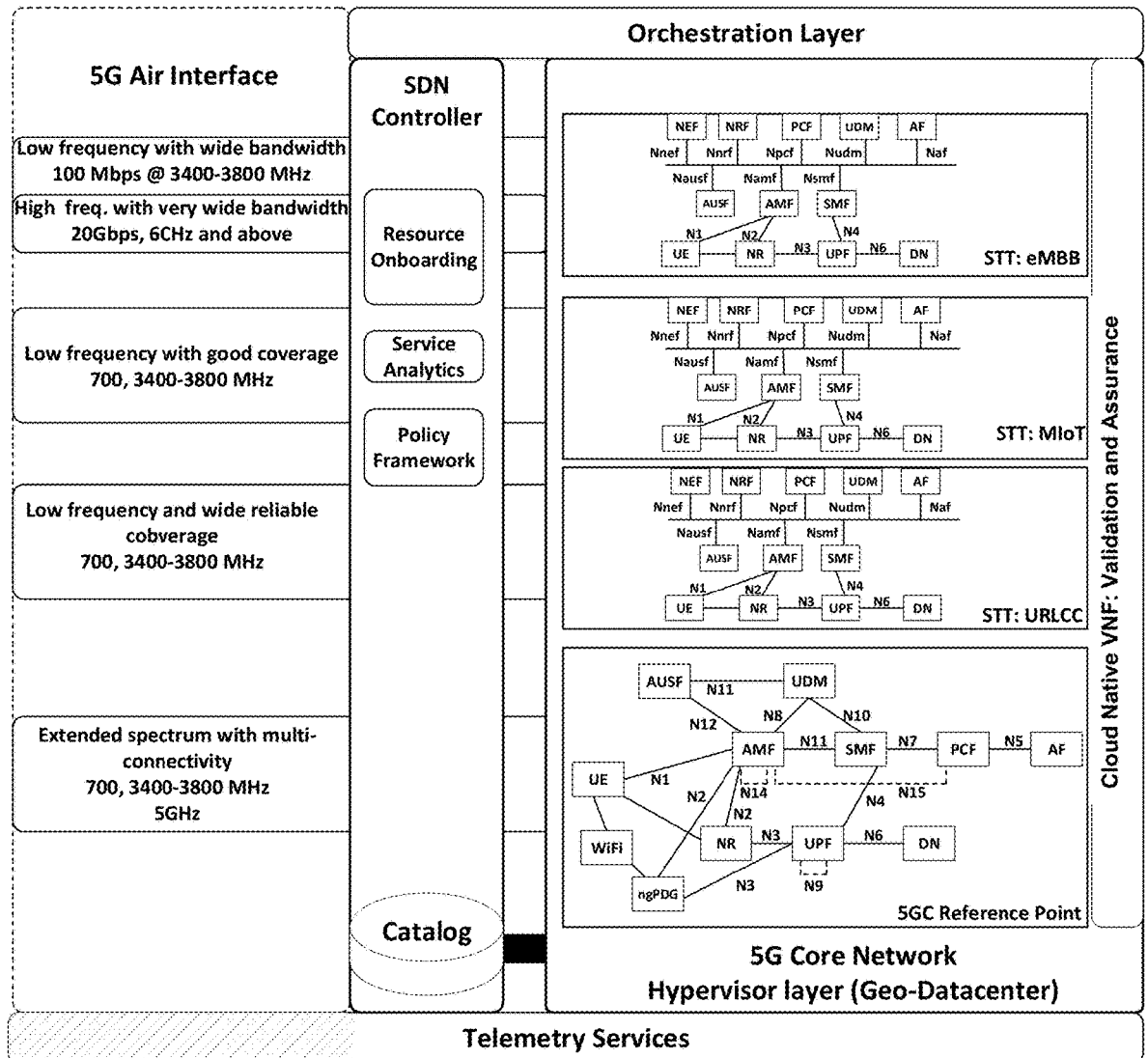
FIG. 3 is a diagram of interactions between a 5G air interface, SDN controller, orchestration layer, telemetry services, and CNFs for validation and assurance.

FIG. 3 is a diagram of interactions between a 5G air interface, SDN controller, orchestration layer, telemetry services, and CNFs for validation and assurance. There are multiple service slices in 5G cores. There are multiple 5G cores up and running based on a number of supported slice services. Each core is associated with a certain logic network that is identified by the slice/service type (SST). Orchestrators/SDNs manage the association of components and large-scale topology.

Figure 4:
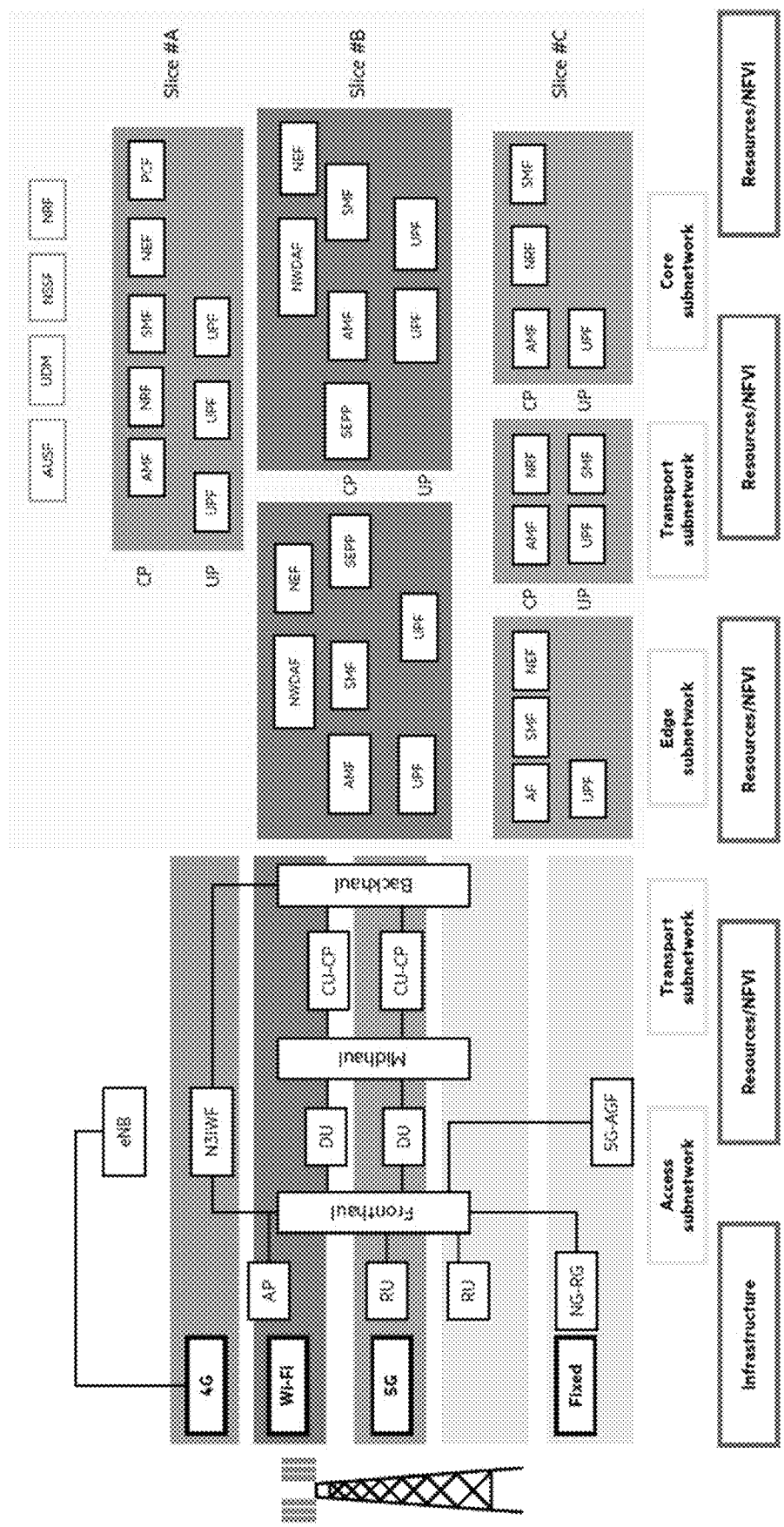
FIG. 4 is a network diagram of digital infrastructure for three example slices, slice #A, #B, #C.
Figure 5:
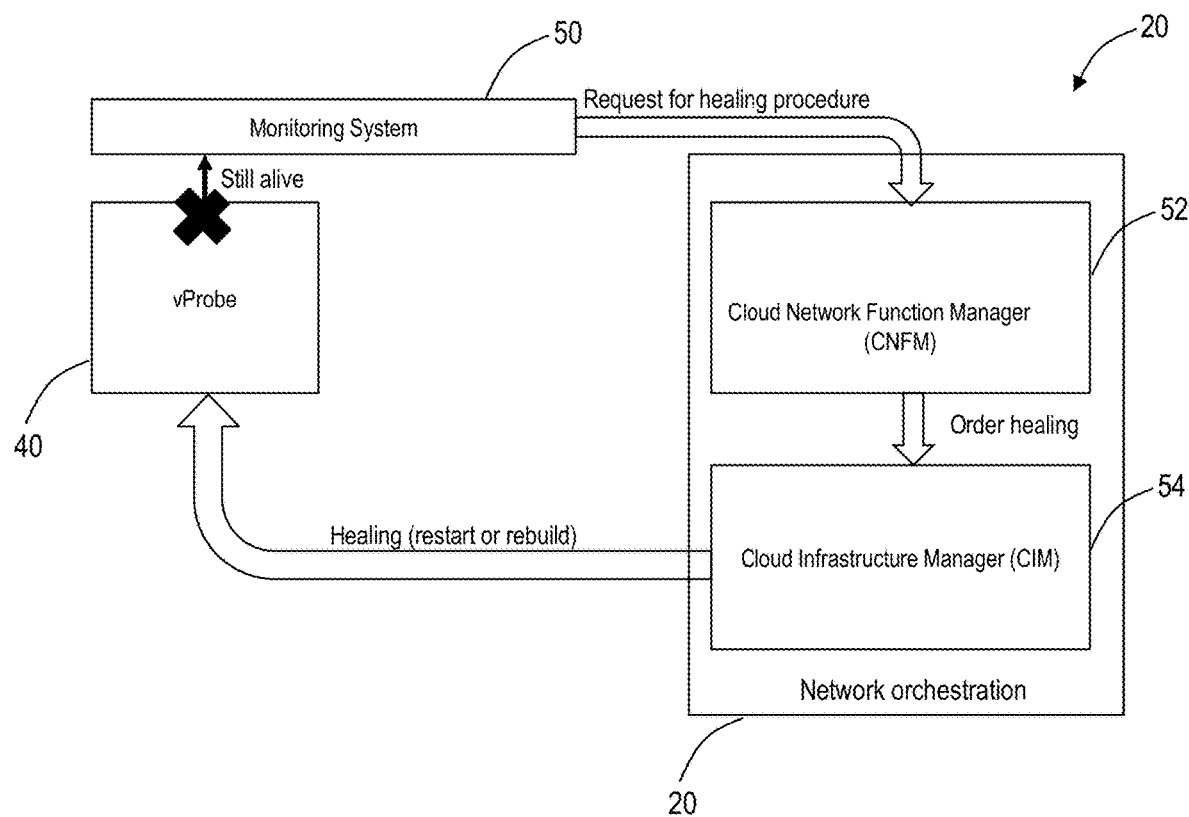
FIG. 5 is a diagram of probe orchestration.

FIG. 4 is a network diagram of digital infrastructure for three example slices, slice #A, #B, #C. FIG. 5 is a diagram of probe 40 orchestration. First, the probes 40 are referred to as vProbes, virtual probes, and can be CNFs. Specifically, if a probe 40 is out-of-order, a healing procedure can be automatically triggered for high availability and less administration. A monitoring system 50 can detect issues with the probe 40 and set a standby probe 40S to active and request a healing procedure via the orchestrator 20, via a CNF manager (CNFM) 52 that initiates the request and virtual infrastructure manager (CIM) 54 that allocates or liberates the associated resources.

Monitoring in Distributed Clouds

The probes 40 and NFs collect anomaly data from different network cores and ingest them into big data or the monitoring system 50. The sessions are processed in various distributed core elements without having synchronization between clouds or proactive recovery LCM using probe analytics.

The present disclosure includes a workflow engine as a middle layer between the monitoring system 50 and the orchestrator 20 to trigger dynamic LCM events for associated clouds. The anomaly events could also be used to trigger LCM for probes. That is, the present disclosure utilizes slice internal analytics to automate logic networks for 5G and beyond. Sessions are processed in various distributed core elements without having synchronization between clouds or proactive recovery lifecycle management (LCM) using probe analytics.

Existing monitoring approaches lack any self-healing mechanism to handle scalability or issues found during self-troubleshooting, have no ability to enforce the instantiation of dedicated probes/data storage that can handle specific sets of data or certain datacenters, and there is no mechanism to adapt solution topology to meet the changes in network or footprint. Existing monitoring approaches are not compliant with zero-touch visions, i.e., automated approaches.

In the 5GC network, the LCM is managed using Kubernetes or the orchestrator 20 without any consideration to analytics obtained in real-time from the cloud. Operators use a monitoring solution to detect anomalies without leveraging the troubleshooting reports for real-time LCM operations, especially in large-scale networks. 5GC NFs will be distributed across multiple data raising questions about the of the mechanism that NFV/MANO will use to handle balanced loads across clouds.

Figure 6:
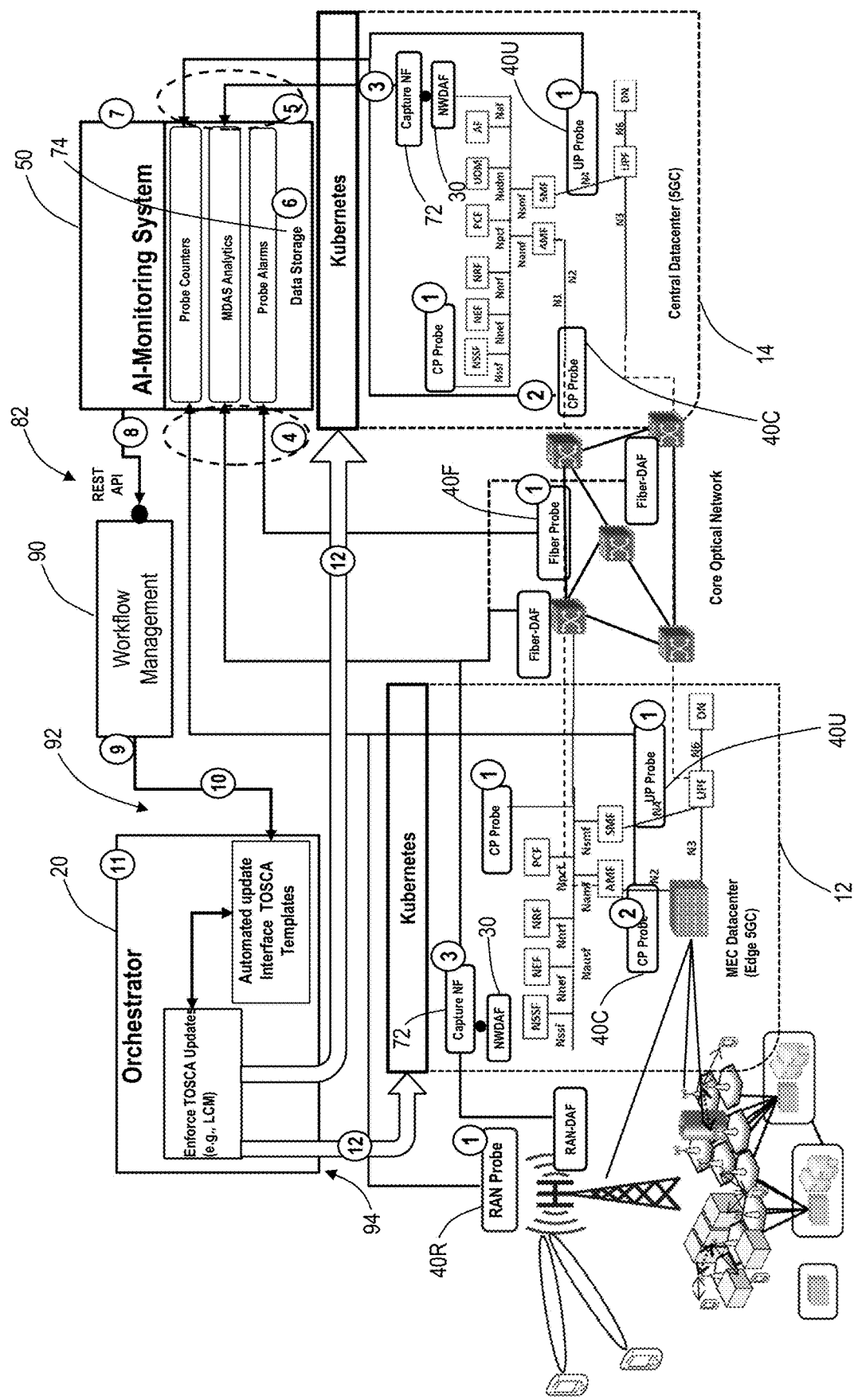
FIG. 6 is a network diagram illustrating automatic workflow generation.

FIG. 6 is a network diagram illustrating automatic workflow generation for the cloud-based network 10. The following interfaces, groups, and components are utilized herein. An interface #1 includes user plane (UP) probes 40U that capture UP traffic from UPF interfaces on the central cloud or intermediate UPF (I-UPF) on MEC clouds. The interface #1 also includes RAN probes 40R located at the RAN, edge cloud, etc., and fiber probes 40F in the optical network.

An interface #2 includes control plane (CP) probes 40C that capture signaling messages from 5GC NFs/service-based architecture (SBA).

An interface #3 includes a capture unit 72 that is an NF that is configured to collects messages from the NWDAF 30.

Group #4 includes all data collected from the MEC datacenter(s) 12. Group #5 includes all data collected from the central datacenter 14.

Component #6 is data storage 74 for the solution. This could also be replicated with other components in local datacenters as explained below.

Component #7 is the monitoring system 50 including probe counters, MDAS analytics, and probe alarms.

Interface #8 is an application programming interface (API) 82, such as a representational state transfer (REST) API, use to export anomaly alarms in form of commands to a workflow engine 90.

Component #9 is the workflow engine 90 or service that is used to execute processes (alarms, binaries) on the monitoring system 50 via specified virtual instances through the REST APIs 82 accessible in a cloud environment (e.g., mistral). For example, the workflow engine 90 can be implemented in the monitoring system 20.

Interface #10 includes APIs 92, such as REST APIs, for embedding the workflow processes into the TOSCA templates 56.

Component #11 is the network grand orchestrator 20 component used for network automation. It involves two functions for the proposal: Automated update of TOSCA templates or automated creation of new one to define new LCM operation 56 and to enforce TOSCA Updates by triggering new Modify operation that updates the VNF descriptor by adding the new interface for the newly defined operation.

Interface #12 is an API 94, such as a REST API, used to connect the network orchestrator 20 with the datacenters 12, 14. APIs aligned with MEF standard should be a good implementation example of this interface.

In an embodiment, there can be encryption between the various components of the all monitoring solution including smaller elements of any component. Moreover, it is possible to use field encryption to hide the subscriber information (e.g., IMSI) across the solution.

Anomaly Collection via the Probes and Capture Units

Continuing with FIG. 6, there are various data sources that collect various counters and messages from different interfaces and NFs. As described herein, the interfaces are as described above. The NFs can be CNFs or physical devices, including various components in the datacenters 12, 14.

The monitoring system 50 advantageously is able to obtain a view of the entire network via the probes 40C, 40U, 40R, 40F and the capture units 72. The probes 40 are configured to obtain telecom related data and the capture units 72 are configured to obtain computing-related date (i.e., virtualized Information Technology (IT) infrastructure). The monitoring system 50 has the ability to correlate the telecom and IT data.

The RAN probe 40R captures info from a base station about user equipment (UE) location, RAN data, available frequency bands, available bandwidths, degradation in air interface through specific measurements of quality of service (QoS), drop reasons, throughput, transmission volume for each connection, transmission volume for each base station. The RAN probe 40R draws the topology for the network, can use call trace to add UE details, and then use another enrichment interface to capture international mobile subscriber identity (IMSI) for mapping UE location, status, transmission profile with passive monitoring solution on the core side.

The fiber probe 40F can tap into the transport network that connects various segments of the network and provides alarms about fiber cracks and deviation in performance caused by reflections or loss. Those probes also report alarms to the monitoring system 50 through API. This also allows to draw granularity per fiber link that allows visibility of fiber topology to the central monitoring system.

Again, the CP probes 40C capture all CP signaling for all 5GC interfaces, and the UP probes 40U capture UP traffic on the 5GC. The RAN probe 40E captures UE transmission profile (air interface domain), and the fiber probe 40F monitors the fiber (transport) network.

The monitoring system 50 captures telecom KPIs using the passive monitoring probes 40 and can correlate to captured analytics by the capture unit 72 NFs subscribed to the NWDAF 30. For example, delays in UE registration or messages between NFs may be caused by 1) overloaded NFs (limited computational resources) or 2) NF functionality failures. The monitoring system 50 can process all probes data and NWDAF analytics to diagnose the error cause and trigger the necessary actions (probe instantiation or core network LCM).

The monitoring system 50 can select sets of KPIs and apply formulas to detect anomalies triggering LCM. Here, the monitoring system 50 can create subfamilies of KPIs Driving new LCM operations to LCM for the various architectures described herein. Finally, the monitoring system 50 can create rules that generate alarms. As described herein, lifecycle management relates to end customer experience, such as QOS, quality of experience (QOE), service layer agreements (SLA), root cause analysis, troubleshooting, etc. That is, the lifecycle management relates to anything in the 5GC that impacts service to subscribers.

The API 82 for the interface #8 can be a consumer that is created to parse anomaly related LCM. Responsive to anomaly detection, a customized workflow creation can be triggered to perform new remediations actions with new LCM operation "custom," described below.

The workflow engine 90, component #9, can push the newly created workflow to the orchestrator 20 through a network service (NS) Lifecycle management interface in the form of a subfile TOSCA format and/or YANG models for a CNF configuration.

The orchestrator 20, the component #11, can embed the new workflow to the onboarded CNF package and enforce TOSCA updates (interfaces section considers the new workflow) via a CNF package management interface sol005. The workflow management component enforces the orchestrator to launch the modify LCM operation to update the CNF package via NS LCM sol005 Interface.

The API 94 for the interface #12 can be used to perform the custom LCM operation by triggering the custom operation from the workflow management 90 component to perform the newly created workflow with remediation actions.

The monitoring system 50 via the workflow engine 90 can cause probe instantiation or core network LCM. For the probe insanitation, once an anomaly is detected, or alarms from NWDAF, or new NFs instantiated, or following network LCM transitions that cause new topology/core to exist, a generic or dedicated probe 40 is instantiated or removed.

For the core network LCM, once the source of an anomaly is detected to be network related issue—for example, NF failure, NF scalability, topology, connectivity issues between core network components that are distributed over multiple clouds, etc., this proposed solution will trigger core network LCM: 1) recreate NFs, or assign resources or, migrate NFs, etc. 2) trigger a $2^{nd}$ probe LCM to reattach probes to the new workflow for continuous monitoring.

Custom Operations

Events triggered by the monitoring system 50 are used to capture a subset of anomaly data from a 5GC slice (datacenters 12, 14). This is performed with zero touch operation: events are triggered by a prediction engine associated with the monitoring system 50.

The custom operations defined in the proposed workflow could be related to the probes 40 or other NFs. This can include, for example, instantiating a new component (either a new data source, dedicated probe, cluster-based data storage (elastic search), and the like; scaling an existing component (or subcomponents) without affecting existing CNFs/NFs/NS; healing the monitoring system 50; modifying an existing component (probe to be dedicated for a certain subset of data or selected NFs through rules modification); terminating components of the monitoring system 50, including removing a dedicated probe after restoring normal operation, releasing the associated resource to reduce the footprint, etc.

There can be custom monitoring system 50 operations, such as a change in the topology (example: adding new data storage for certain data centers to reduce the signaling and data transmission between probes located in multiple sites). This can be achieved by pushing multiple custom workflows triggered by massive sudden increase in the traffic captured in certain network sites. The instantiation of multiple dedicated probes 40 and the request from the customer to have dedicated data storage for a subset of data. Dynamic adaptation in the monitoring system 50 reduces the overall footprint/consumed resources. This operation is driven by network scalability events, for self-optimization and self-troubleshooting of the monitoring system 50.

For custom core network operations, the anomaly indicators can be used to trigger LCM events that recover network function normal and optimum behavior. This can include deciphering TLS1.3 on 5GC HTTP/2 interfaces for automated capture of network messages. There is a need to use specific mechanism that include NF attached sensors to retrieve the keys for the probe capturing unit.

This can also include harmonizing the processing capacity between components (network functions) for the core located in different datacenters 12, 14. This includes scalability load balancing, traffic diversion, etc. The 5G NFs may be located in multiple cloud datacenters 12, 14 and there is a need to synchronize the amount of resource dedicated for those NFs based on the incoming traffic.

This can also include using the topology to maintain the connectivity between various 5G core NFs for more robust network infrastructure. This can use a repository of the NFs explored by the monitoring system 50 to identify any missing or failed 5G core network functions during correlation between different time events to trigger network lifecycle management from the orchestrator 20 through the proposed workflow.

Framework to Perform Custom Operations

Figure 7:
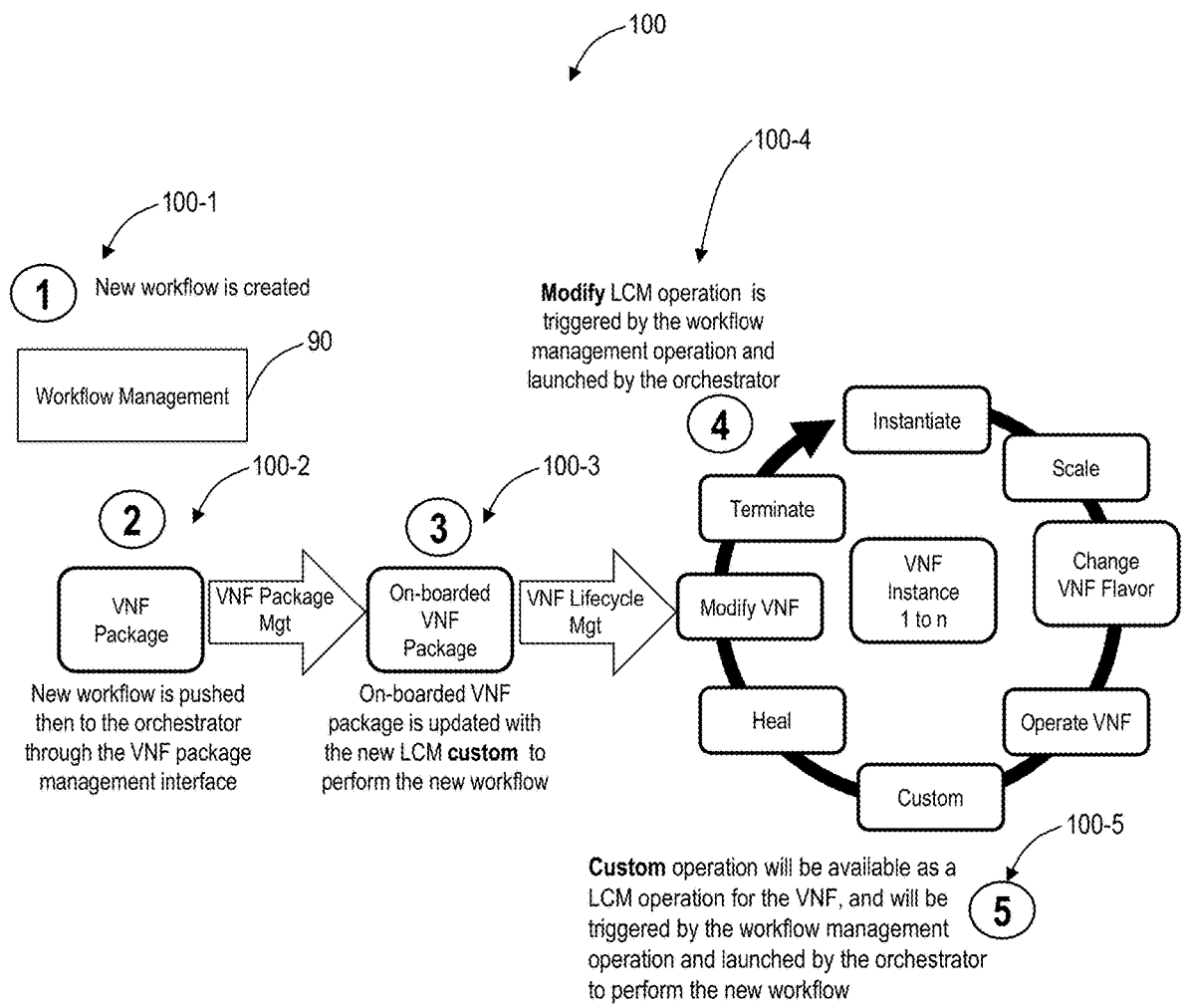
FIG. 7 is a flow diagram of a framework to perform customer operations.

FIG. 7 is a flow diagram of a framework to perform custom operations 100. A new workflow is created by the workflow engine 90 (step 100-1). The new workflow is pushed then to the orchestrator through the CNF package management interface (step 100-2). The onboarded CNFM package is updated with the new LCM custom to perform the new workflow (step 100-3). The modify LCM operation is triggered by the workflow management operation and launched by the orchestrator 20 (step 100-4). The custom LCM operation is triggered by the workflow management operation and launched by the orchestrator to perform the new workflow (step 100-5)

Workflow Service Process

Figure 8:
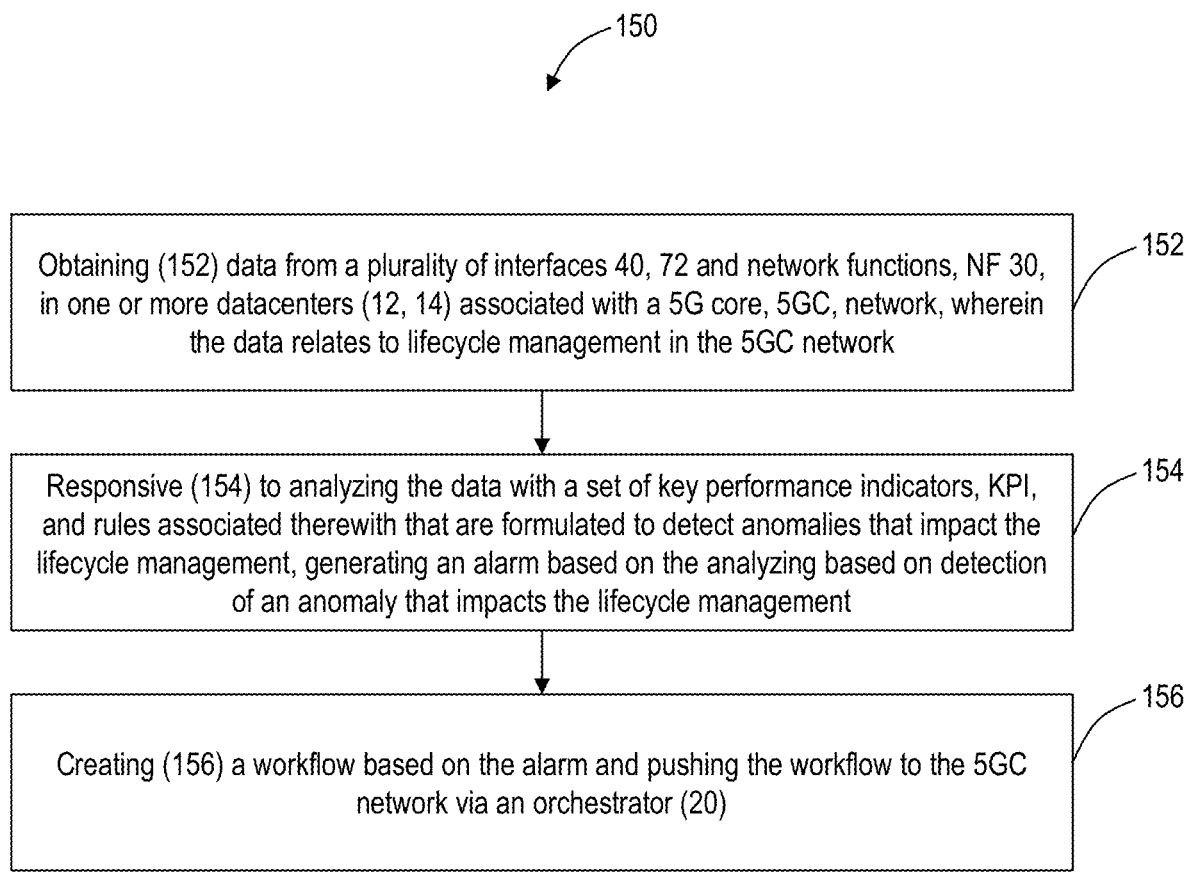
FIG. 8 is a flowchart of a workflow service process implemented by the workflow engine.

FIG. 8 is a flowchart of a workflow service process 150 implemented by the workflow engine 90. The process 150 can be implemented as a method that includes steps, via a processing device configured to execute the steps, and via a non-transitory computer-readable medium that includes instructions that cause one or more processors to implement the steps.

The process 150 includes obtaining 152 data from a plurality of interfaces 40, 72 and network functions, NF 30, in one or more datacenters 12, 14 associated with a 5G core, 5GC, network, wherein the data relates to lifecycle management in the 5GC network; responsive 154 to analyzing the data with a set of key performance indicators, KPI, and rules associated therewith that are formulated to detect anomalies that impact the lifecycle management, generating an alarm based on the analyzing based on detection of an anomaly that impacts the lifecycle management; and creating 156 a workflow based on the alarm and pushing the workflow to the 5GC network via an orchestrator 20.

The process 150 can further include the orchestrator 20 receiving the workflow as a topology and orchestration specification for cloud applications, TOSCA, template and triggering the workflow as a custom lifecycle management operation. The process 150 can further include obtaining the data from the plurality of interfaces and the NF via a monitoring system 50 and performing the analyzing via an analytics engine 80. The monitoring system 50 and the workflow engine 90 can communicate through application programming interfaces, APIs, in a cloud environment.

The plurality of interfaces can include connections to probes 40 that are virtual network functions, CNF, configured to monitor any of a user plane, UP, and control plane, CP.

The NF are components configured to perform a network data analytics function, NWDAF 30.

The workflow is one of a modify operation and a custom operation, each for a virtual network function, CNF, in the 5GC network.

The workflow is a custom operation to instantiate a new virtual network function, CNF, in the 5GC network, via the orchestrator 20. The custom operation includes any of instantiating a new component in the 5GC network, scaling an existing component in the 5GC network, healing an existing component in the 5GC network, and terminating an existing component in the 5GC network.

The obtaining, the generating, and the creating are performed in real-time during operation of the 5GC network.

Multi-Cloud Automation

Figure 9:
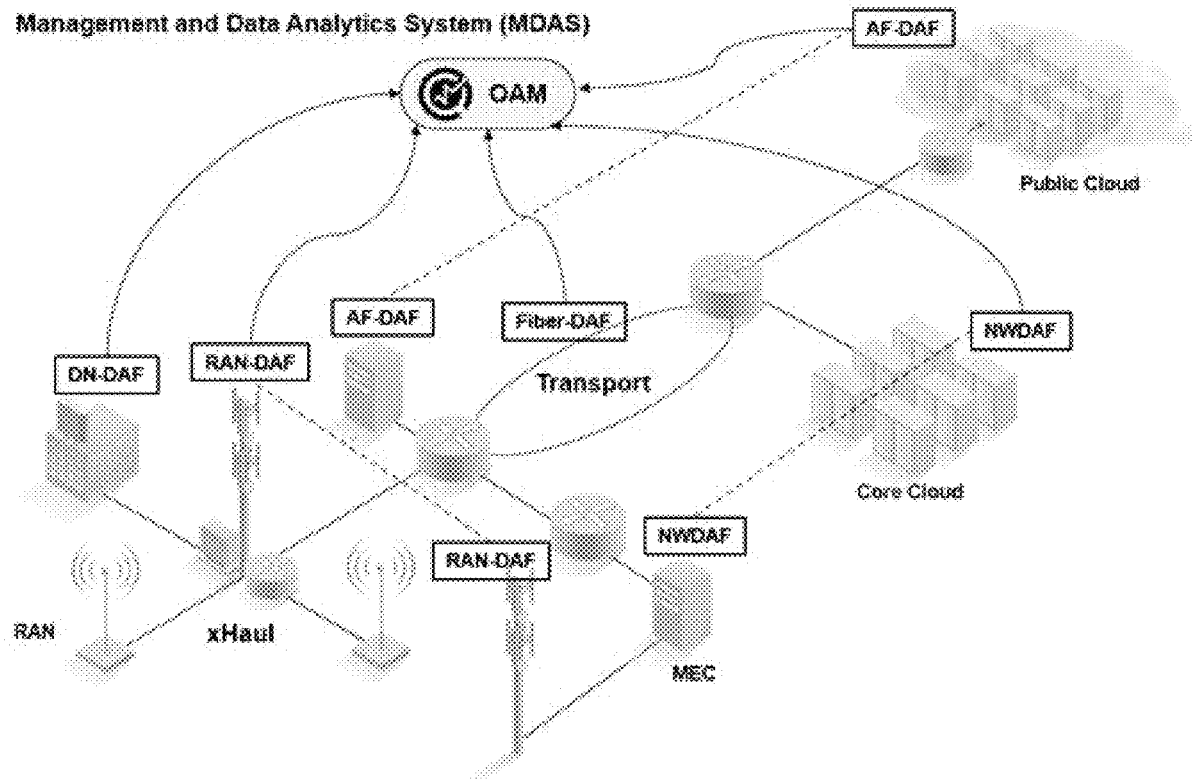
FIG. 9 is a network diagram of multi-cloud automation.

FIG. 9 is a network diagram of multi-cloud automation. A management data analytics system (MDAS) is a system that deploys Data analytics functions (DAFs) across all network segments from the RAN to the core to collect the functional status of network components. The CP probe 40C, UP probe 40U, and RAN probe 40R allow monitoring of sessions per UE from the air interface to core network with all associated NFs (components) and anomalies. This data can be correlated with MDAS for sophisticated smart diagnose of error cause.

The fiber probe 40F monitors the fiber connections between data centers (or multi access edge computing (MEC) nodes). The monitoring probes will detect anomaly and changes in performance/behavior on data centers where fiber connects them. Anomalies from probes and alarms from fiber probes will be used by the monitoring system 50 to trigger a change in topology of the network either by 1) migrating components to avoid defective fiber link, 2) use the topology that has been built by monitoring solution to adapt connectivity using alterative links. The monitoring system 50 can corelate fiber probe alarms with MDAS data to detect QoS impacts and trigger necessary LCMs.

Active Verifier

Figure 10:
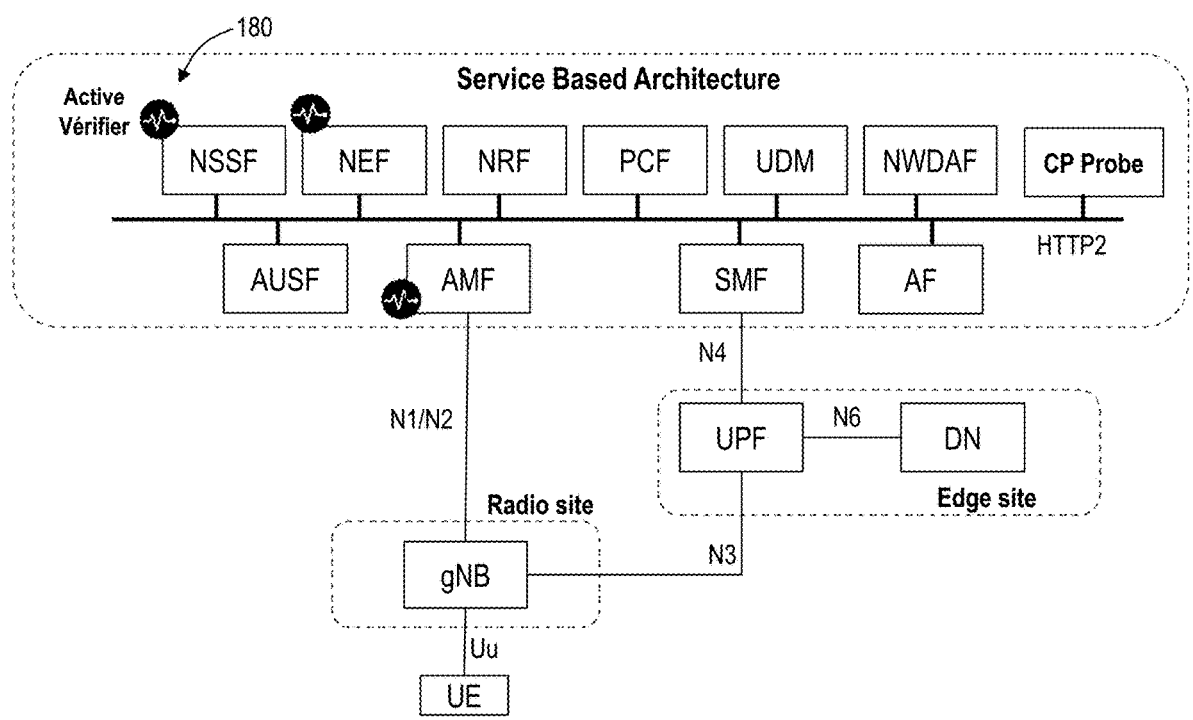
FIG. 10 is a block diagram of a service-based architecture with active verifiers.

FIG. 10 is a block diagram of a service-based architecture with active verifiers 180. The active verifier 180 is an active small NF element that generates messages similar to any NF in the 5GC. To ensure core network functionality, the verifiers 180 are instantiated on selected NFs to trigger messages in the core. This allows monitoring solutions to determine functionality and performance by capturing the messages through probes. This can be also used to analyze functionality of certain components (e.g., RabbitMQ when used as a message bus between NFs in SBA). This transforms a solution from passive to active monitoring, and self-troubleshooting of the probes when a certain probe is malfunctioning—messages are triggered through the verifier 180 and check if the probe can capture this message and time of capturing compared with the time of sending. Also, the verifier 180 is useful to determine the NWDAF functionality in self-troubleshooting mode. The process of launching the verifiers is also triggered by the monitoring system 50 and through workflow changes.

Processing Apparatus

Figure 11:
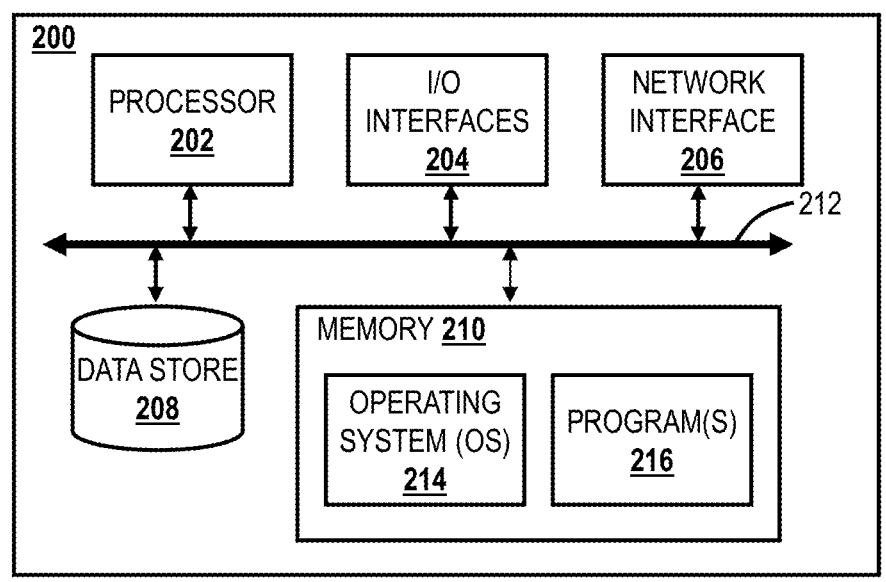
FIG. 11 is a block diagram of a processing apparatus that may be used to realize any of the components described herein.

FIG. 11 is a block diagram of a processing apparatus 200 which may be used to realize any of the components described herein. The processing apparatus 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 11 depicts the processing apparatus 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the processing apparatus 200, a semiconductor-based microprocessor (in the form of a microchip or chip set), or generally any device for executing software instructions. When the processing apparatus 200 is in operation, the processor 202 is configured to execute software stored within the memory 210, to communicate data to and from the memory 210, and to generally control operations of the processing apparatus 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the processing apparatus 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing apparatus 200 such as, for example, an internal hard drive connected to the local interface 212 in the processing apparatus 200. Additionally, in another embodiment, the data store 208 may be located external to the processing apparatus 200 such as, for example, an external hard drive connected to the I/O interfaces 204 (e.g., SCSI or USB connection). In a further embodiment, the data store 208 may be connected to the processing apparatus 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method implemented by a workflow engine comprising:
    obtaining data from a plurality of distributed probes and network functions, NF, in one or more datacenters associated with a 5G core, 5GC, network, wherein the data relates to lifecycle management in the 5GC network and includes telecom data from the distributed probes and computing data from the NF;
    responsive to analyzing and correlating the telecom data and the computing data to detect anomalies that impact the lifecycle management, generating an alarm based on the analyzing based on detection of an anomaly that impacts the lifecycle management; and
    creating a workflow based on the alarm and pushing the workflow to the 5GC network via an orchestrator, wherein the workflow includes automatically instantiating at least one distributed probe as a virtual network function, VNF, during operation of the 5GC network, for obtaining data, for analyzing performance via key performance indicators, for generating call data records, for troubleshooting an issue and identifying a root cause, and for publishing the data on a message bus, and wherein the at least one distributed probe is located in any of a user plane, UP, to capture UP traffic, a control plane CP, to capture signaling messages, a radio access network, RAN, to capture base station info, and a fiber network, to detect performance deviations.

2. The method as claimed in claim 1, further comprising the orchestrator receiving the workflow as a topology and orchestration specification for cloud applications, TOSCA, template and triggering the workflow as a custom lifecycle management operation.

3. The method as claimed in claim 1, further comprising obtaining the data from the plurality of distributed probes and the NF via a monitoring system that implements the workflow engine and is connected to the plurality of distributed probes and the NF.

4. The method as claimed in claim 3, wherein the monitoring system and the workflow engine communicate through application programming interfaces, APIs, in a cloud environment.

5. The method as claimed in claim 1, wherein the plurality of distributed probes include cloud network functions, CNFs, that include any of user plane, UP, probes, control plane, CP, probes, radio access network, RAN, probes, and fiber probes.

6. The method as claimed in claim 1, wherein the NF are components configured to obtain the computing data in the data centers from a network data analytics function, NWDAF.

7. The method as claimed in claim 1, wherein the workflow is one of
    removing a probe,
    recreating NFs, assigning resources to NFs, or migrating NFs,
    a modify operation and a custom operation, each for a cloud network function, CNF, in the 5GC network,
    a custom operation to instantiate a new virtual network function, VNF, in the 5GC network, via the orchestrator, and
    instantiating an active verifier to trigger messages in the 5GC network to determine functionality and performance.

8. The method as claimed in claim 1, wherein the obtaining, the generating, and the creating are performed in real-time during operation of the 5GC network.

9. A system comprising one or more processors configured to implement a workflow engine that causes the one or more processors to:
    obtain data from a plurality of distributed probes and network functions, NF, in one or more datacenters associated with a 5G core, 5GC, network, wherein the data relates to lifecycle management in the 5GC network and includes telecom data from the distributed probes and computing data from the NF;
    responsive to analyzing and correlating the telecom data and the computing data to detect anomalies that impact the lifecycle management, generate an alarm based on the analyzing based on detection of an anomaly that impacts the lifecycle management; and
    create a workflow based on the alarm and pushing the workflow to the 5GC network via an orchestrator, wherein the workflow includes automatically instantiating at least one distributed probe as a virtual network function, VNF, during operation of the 5GC network, for obtaining data, for analyzing performance via key performance indicators, for generating call data records, for troubleshooting an issue and identifying a root cause, and for publishing the data ona message bus, and wherein the at least ne distributed probe is located in any of a user plan, UP, to capture UP traffic, a control plane CP, to capture signaling messages, a radio access network RAN, to capture base station info, and a fiber network, to detect performance deviations.

10. The system as claimed in claim 9, wherein the orchestrator receives the workflow as a topology and orchestration specification for cloud applications, TOSCA, template and triggering the workflow as a custom lifecycle management operation.

11. The system as claimed in claim 9, wherein the data is obtained from the plurality of distributed probes and the NF via a monitoring system that implements the workflow engine and is connected to the plurality of distributed probes and the NF.

12. The system as claimed in claim 9, wherein the plurality of distributed probes include cloud network functions, CNFs, that include any of user plane, UP, probes, control plane, CP, probes, radio access network, RAN, probes, and fiber probes.

13. The system as claimed in claim 9, wherein the NF are components configured to obtain the computing data in the data centers from a network data analytics function, NWDAF.

14. The system as claimed in claim 9, wherein the workflow is one of
- removing a probe,
- recreating NFs, assigning resources to NFs, or migrating NFs,
- a modify operation and a custom operation, each for a cloud network function, CNF, in the 5GC network,
- a custom operation to instantiate a new virtual network function, VNF, in the 5GC network, via the orchestrator, and
- instantiating an active verifier to trigger messages in the 5GC network to determine functionality and performance.

15. The system as claimed in claim 9, wherein the obtaining, the generating, and the creating are performed in real-time during operation of the 5GC network.

16. A non-transitory computer-readable medium having instructions stored thereon for programming a workflow engine to perform steps of:
- obtaining data from a plurality of distributed probes and network functions, NF, in one or more datacenters associated with a 5G core, 5GC, network, wherein the data relates to lifecycle management in the 5GC network and includes telecom data from the distributed probes and computing data from the NF;
- responsive to analyzing and correlating the telecom data and the computing data to detect anomalies that impact the lifecycle management, generating an alarm based on the analyzing based on detection of an anomaly that impacts the lifecycle management; and
- creating a workflow based on the alarm and pushing the workflow to the 5GC network via an orchestrator, wherein the workflow includes automatically instantiating at least one distributed probe as a virtual network function, VNF, during operation of the 5GC network, for obtaining data, for analyzing performance via key performance indicators, for generating call data records, for troubleshooting an issue and identifying a root cause, and for publishing the data on a message bus, and wherein the at least one distributed probe is located in any of a user plane, UP, to capture UP traffic, a control plane CP, to capture signaling messages, a radio access network, RAN, to capture base station info, and a fiber network, to detect performance deviations.

17. The non-transitory computer-readable medium as claimed in claim 16, further comprising the orchestrator receiving the workflow as a topology and orchestration specification for cloud applications, TOSCA, template and triggering the workflow as a custom lifecycle management operation.

18. The non-transitory computer-readable medium as claimed in claim 16, further comprising obtaining the data from the plurality of distributed probes and the NF via a monitoring system that implements the workflow engine and is connected to the plurality of distributed probes and the NF.

19. The non-transitory computer-readable medium as claimed in claim 16, wherein the plurality of distributed probes include cloud network functions, CNFs, that include any of user plane, UP, probes, control plane, CP, probes, radio access network, RAN, probes, and fiber probes.

20. The non-transitory computer-readable medium as claimed in claim 16, wherein the workflow is one of
- removing a probe,
- recreating NFs, assigning resources to NFs, or migrating NFs,
- a modify operation and a custom operation, each for a cloud network function, CNF, in the 5GC network,
- a custom operation to instantiate a new virtual network function, VNF, in the 5GC network, via the orchestrator, and
- instantiating an active verifier to trigger messages in the 5GC network to determine functionality and performance.

\* \* \* \* \*